United States Patent [19]

Petschik et al.

[11] Patent Number: 5,353,387
[45] Date of Patent: Oct. 4, 1994

[54] PROCESS FOR REDUCING THE QUANTITY OF INK APPLIED TO RECORDING SUBSTRATES BY INK PRINTING DEVICES TO PREVENT IMAGE DEGRADATION

[75] Inventors: Benno Petschik, Markt Schwaben; Stefan Scherdel, München, both of Fed. Rep. of Germany

[73] Assignee: Mannesmann Aktiengesellschaft, Dusseldorf, Fed. Rep. of Germany

[21] Appl. No.: 59,839

[22] Filed: May 10, 1993

Related U.S. Application Data

[63] Continuation of Ser. No. 30,028, May 10, 1993.

[30] Foreign Application Priority Data

Sep. 10, 1990 [DE] Fed. Rep. of Germany ..... 90117406

[51] Int. Cl.$^5$ .......................... G06F 3/12; G06F 15/62
[52] U.S. Cl. .................... 395/109; 395/103; 395/108; 395/110; 347/15; 347/43
[58] Field of Search ............... 395/104, 103, 101, 108, 395/109, 110; 346/1.1, 140 R

[56] References Cited

U.S. PATENT DOCUMENTS 4,999,646  3/1991  Trask .................................. 346/1.1

FOREIGN PATENT DOCUMENTS 0317140  11/1988  European Pat. Off. .
0400680A2  6/1990  European Pat. Off. .

Primary Examiner—Robert L. Richardson
Attorney, Agent, or Firm—Cohen, Pontani, Lieberman, Pavane

[57] ABSTRACT

The inventive method reduces the quantity of the actual number of pixels to be printed to attain a given resolution, on average, by half, with each two or pair of adjacent pixels of the original print information being sequentially processed to form a print pixel and a socalled white or unprinted pixel. The arrangement of print pixels and white pixels is effected so as to print a checkerboard pattern. The ink droplets accordingly have the smallest possible substrate or print media contact area so that adjacent ink droplets which are not yet dry are effectively prevented from running together and thereby degrading the resulting image.

10 Claims, 2 Drawing Sheets

| Carry-over (old) | Pixel A | Pixel B | Print pixel | Carry-over (new) |
|---|---|---|---|---|
| OLD | A | B | PIX | NEW |
| 0 | 0 | 0 | 0 | 0 |
| 0 | 1 | 0 | 1 | 1 |
| 0 | 0 | 1 | 1 | 1 |
| 0 | 1 | 1 | 1 | 0 |
| 1 | 0 | 0 | 0 | 0 |
| 1 | 1 | 0 | 0 | 0 |
| 1 | 0 | 1 | 0 | 0 |
| 1 | 1 | 1 | 1 | 1 |

PROCESS FOR REDUCING THE QUANTITY OF INK APPLIED TO RECORDING SUBSTRATES BY INK PRINTING DEVICES TO PREVENT IMAGE DEGRADATION

CROSS REFERENCE TO RELATED APPLICATION

This is a continuation of Ser. No. 08/030,028 filed May 10, 1993, under 35 U.S.C. §111.

FIELD OF THE INVENTION

The present invention is directed to a process for reducing the quantity of ink applied to recording substrates or print media by ink writing or printing devices such, for example, as ink jet and dot matrix printers.

BACKGROUND OF THE INVENTION

So-called mosaic or dot matrix printing devices are used for producing printed images or characters that are formed in the manner of a mosaic from a plurality of individual dots. Such printing devices may, by way of example, advantageously utilize or incorporate an ink printing mechanism which includes an ink print head operating either by piezoelectric or by thermoelectric principles. A characteristic of such ink printing devices is that the character and/or graphic image pattern to be printed on the print medium or substrate is not printed as a single, unitary or continuous form or entity but, rather, is made up of a multitude of individual small dots. The print quality of the resulting characters understandably depends substantially on the resolution which, in turn, is determined by the number of individual dots that make up each character or, in other words, by the quantity of lines and columns of dot positions defined in the character matrix within which the character is formed.

German publication DE 28 43 064 describes an ink print head for use in an ink matrix writing device provided with a multitude of outlet nozzles in a highly dense arrangement and from which individual ink droplets are ejected and guidedly thrown against a print medium. The ejection of droplets in such so-called drop-on-demand or ink jet print heads is effected under the influence of thermoelectric converter elements that are implemented in the form of heat resistors on a substrate, can be individually controlled and are associated with individual ink ducts. When the individual heat elements are triggered by electrical pulses or the like, an ink steam bubble is produced in the respective ink duct and leads to the ejection of an individual droplet of ink. This process, known as the bubble jet technique, makes it possible to construct an ink writing device of high resolution in which the writing or printing head may be fabricated with numerous narrow nozzle openings arranged closely adjacent one to another.

Such an ink print head can be used for black-and-white as well as for color ink printing. In a multiple-color printing apparatus, the individual ink print head may have or include a plurality of partial ink print heads associated therewith and in which each partial ink print head is separately and independently operable for impressing or ejecting a separate color ink. When using the primary colors cyan, magenta and yellow, a total of eight different colors can thereby be produced at one pixel position—i.e. white (no printing); cyan, magenta and yellow when only one primary color is printed; red, green, and blue when two primary colors are printed one atop the other; and black by printing all three primary colors in superposed relation atop one another. A black pixel can also, or alternatively, be produced by directly printing an individual pixel with black ink instead of the superimposed printing of cyan, magenta and yellow ink dots. This latter alternative has the advantage that a notably decreased or "simple" amount of solvent is applied to the paper or print medium since only one pixel is printed rather than three, or one drop of ink is applied rather than three. Moreover, the cyan, magenta and yellow inks are not so ideal that their superposed application to the print medium will result in a pure black. This alternative procedure of printing the color black is further advantageous since it necessitates the use of only the black print head when the device or apparatus is operated as a black-and-white printer.

The overall color impression produced by color printing is created by additive color mixing of the individual pixels of the aforementioned eight colors applied adjacent one another on the print medium.

When color printing is carried out with such an ink printing device, the increased application of color can result in a running or blurring of adjacent pixels which are not yet dry. This leads to a washed-out graphic image and is disadvantageous for achieving edge sharpness of the character or image thereby produced. There is also the further risk that the print medium will become uneven or wavy as a result of the excessive moisture of the ink liquids that are applied to the medium.

In addition, it is often also possible to print on different types of print media with such ink printing devices such, for example, as individual sheets, margin-perforated endless paper webs or transparent sheets as used, e.g., in overhead projectors and the like.

A further problem occurs when printing on transparent, smooth sheets at full dot density (e.g. 300 dpi), which often results in running of the applied liquid ink and of the printed image impressed on or to the sheet of print medium material as the individual ink droplets run together when making contact with the sheet.

SUMMARY OF THE INVENTION

It is therefore the primary object of the invention to provide a method for reducing the quantity of ink applied to a print medium or substrate by an ink writing device without effecting noticeable defects in print quality while maintaining correct effective color reproduction in color printing.

In accordance with the present invention, the quantity of pixels to be printed on the print medium is reduced by half in that each two adjacent pixels of the original print information of the image or character are processed to form a print pixel and an associated white pixel. This process is advantageously effected by means of a simple reduction controller in the central control unit of the printing device so that the time required for carrying out this method is very short, thereby enabling real-time processing of the print data.

The disclosed process is equally suitable for single-color and for multiple-color printing. When printing multiple colors, the reduction process is carried out separately for each individual color separation—i.e., by way of example, for each of cyan, magenta, yellow.

The preferred and herein-taught arrangement of the print pixels and white pixels in a checkerboard pattern results in the smallest possible print medium contact surfaces for the individual ink droplets and thereby reduces the risks that different colored inks will be blurred or run on the print medium and that the paper or print medium does not curl or become wavy. In multiple-color printing, image or character reproduction is effected with substantially and essentially correct colors.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein similar reference characters denote similar elements throughout the several views.

DETAILED DESCRIPTION OF THE PREFERRED EMBODIMENTS

It should at the outset be noted that, with the exception of the reduction controller device, the following disclosure is directed to the processes (program runs) or methodologies—as opposed to component or functional groups or elements of a printing device—appropriate to an understanding of the present invention.

Figure 1:
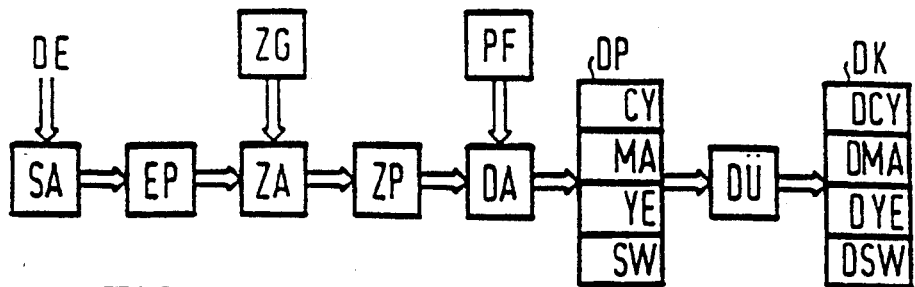
FIG. 1 is a schematic block diagram of the signal processing arrangement in an ink printing device.

In the original processing of an image or pattern or character(s) in or for a known or conventional ink printing device which is diagrammatically or schematically depicted in FIG. 1, the data, as from a computer, which is fed serially or in parallel to the data input DE of the printing device is converted by an interface adapter SA to the internal print format of the device and is stored in the receive buffer EP. A line preparation ZA retrieves the data from the receive buffer EP. Characters requiring or intended to initiate immediate action—for example control commands such as reset signals and reprogramming directives or the like—are applied or carried out at once. Print data, on the other hand, is transmitted to the line buffer ZP. When the print data is in character-oriented form, the character generator ZG supplies information about the multiple pixels from which each character to be printed is composed or formable. The print preparation device or controller DA converts the information from the line buffer ZP into the actual print image and writes it to the print buffer DP.

A reduction controller, which is hereinafter described in additional detail, is integrated in or with the print preparation device DA and receives the print data converted from the information transferred thereto from the line buffer ZP. The print buffer DP includes four partial regions—CY, MA, YE, SW—of the same size and which are associated with corresponding partial print heads (DCY, DMA, DYE, DSW). The nozzle control DU retrieves the information from the print buffer DP and transmits it to the nozzles of the individual ink print heads. The ink print head DK includes the four partial print heads DCY, DMA, DYE, DSW, each containing Coy way of example) 50 nozzles that are arranged closely-adjacent one another and are constructed so that a print image of 300 dpi resolution can be attained in the resulting image. The partial print head DSW is operated with black ink; the print heads DCY, DMA and DYE are operated with cyan, magenta and yellow inks, respectively. In this manner, a colored print image composed of individual pixels can be printed. That is, black pixels are produced by way of the print head DSW, pixels of the colors cyan, magenta and yellow are produced by a respective one of the print heads DCY, DMA and DYE, and pixels of the colors red, green and blue are produced by superimposed printing of two appropriate colors from the print heads DCY, DMA and DYE. A white pixel is represented by a dot position at which no ink is applied to the print medium or paper substrate.

Figure 2:
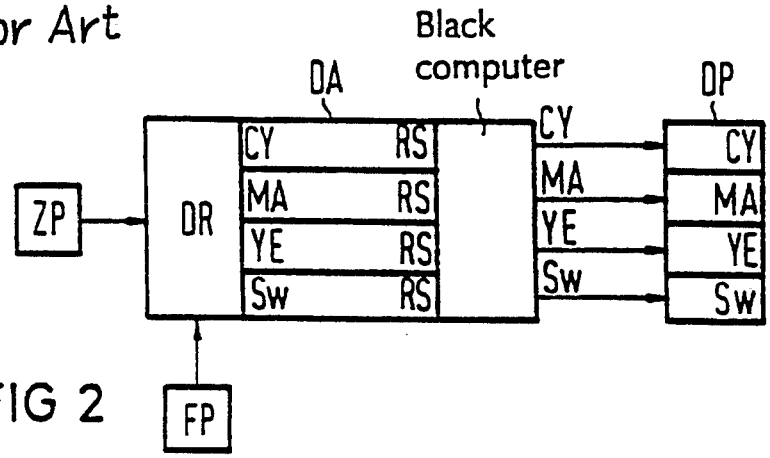
FIG. 2 is a block diagram of the print preparation processing arrangement in color printing.

FIG. 2 depicts the operation of the print preparation controller DA in color printing. The color information available in coded form in the line buffer ZP is converted into a print pixel of the 8 possible colors for each pixel with the aid of the color pallet FP. The color black is initially represented by the relationship $cyan = magenta = yellow = 1$. After each of the three color separations has passed through the same reduction controller RS, the black pixel signal is formed by the black compiler in accordance with the following rule-based procedure:

if $((cy=1)$ and $(ma=1)$ and $(ye=1))$, then:
    $sw=1$; and
    $cy=0$; and
    $ma=0$; and
    $ye=0$; and
    endif.

Figure 3:
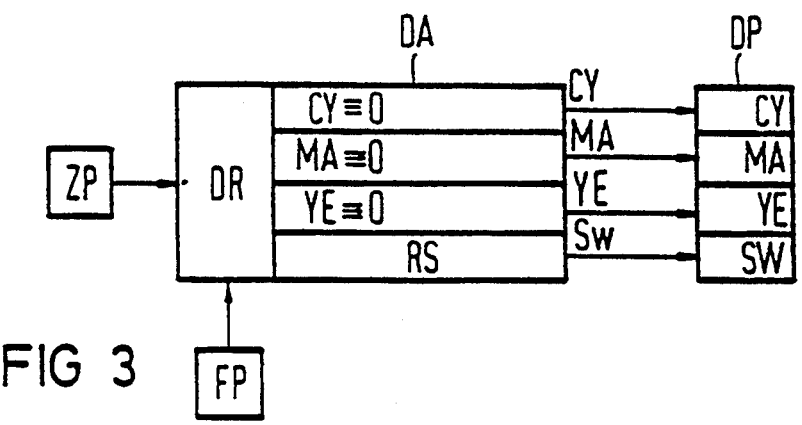
FIG. 3 is a block diagram of the print preparation processing arrangement in black-and-white printing.

In principle, the same procedure may be utilized in black-and-white printing in that where each of a cyan, magenta and yellow pixel is called for to provide a pixel to be printed in black, the reduction is effected in accordance with the process of FIG. 2. FIG. 3, on the other hand, depicts a notably simpler and more rapidly-applied and higher efficiency method. In the FIG. 3 alternative, the black signal passes directly to and through the reduction controller RS without triggering or involving the partial print heads DCY, DMA and DYE.

The operation of the reduction controller RS utilized for reducing the quantity of ink applied to the print medium in accordance with the invention will now be described with particular reference to FIG. 4.

The reduction controller RS assigns a reduced print line for each of the original print lines to be printed, each of which includes Coy way of example) 50 so-called micro-lines corresponding to the 50 nozzles of the print head, so that the number or quantity of pixels to be printed is reduced by half. More particularly, each set or pair of two adjacent pixels of the original print information is processed to form and define a print pixel and a white pixel. The print pixels and white pixels are arranged so as to result, in printing, in a checkerboard-like pattern. The individual pixels, i.e. the individual ink droplets, thereby have the smallest possible print medium or sheet substrate contact surface.

The manner in which the individual pixels of each pair of adjacent pixels is processed will perhaps best be understood by designating the two individual pixels as the pixels A and B. A pixel to be printed is associated with or defined by a logical 1 (intensity 1) and a white pixel—for which no ink need be applied to the print medium—is associated with or defined by a logical 0 (intensity 0). The intensities of the two adjacent pixels in the pixel pair are added together and the resulting sum is then divided by two to yield an intermediate value. In addition, a carry-over value from a next-preceding pair of pixels in the series of pixel pairs being sequentially processed, or in a next-adjacent pair of pixels, is added to the intermediate value to thereby define a final value. If the result of this calculation—i.e. the final value—is equal to 1, a pixel is printed for the print pixel of the pixel pair; if the final value equals 0 or −0.5, on the other hand, no pixel is printed—i.e. the print pixel is a white pixel. When the final value equals 0.5, a pixel is printed and a carry-over value of −0.5 is stored for processing with the next-adjacent or next-processed pair of pixels.

Figures 4, 5:
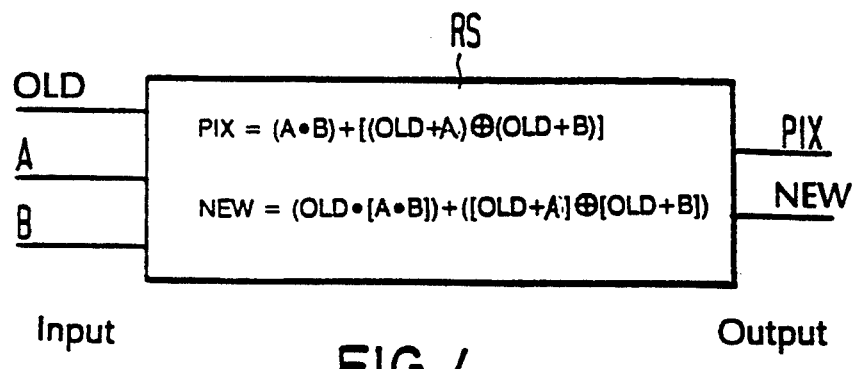
FIG. 4 is a block diagram depiction of a reduction control processing arrangement in accordance with the present invention.
FIG. 5 is assignment table depicting the manner in which an original print line is converted into a corresponding reduced print line in accordance with the invention.

By way of this procedure there results, on the whole, an assignment rule with three input quantities or values—OLD, A and B—and two output quantities or values—PIX and NEW—as shown in FIG. 4. OLD designates the carry-over value from the preceding or adjacent pixel pair, A and B designate the two individual pixels of the pixel pair to be processed, PIX designates the pixel to be printed (PIX=1) or a white pixel (PIX=0), and NEW designates the new carry-over value for the current pixel pair. Thus, it will be recognized that, where the result of the calculations for a given pixel pair indicates that the value of the pixel to be printed is zero, the so-called "print pixel" will actually be a white or unprinted pixel, i.e. a white pixel in addition to the second white pixel that results, irrespective of the calculated value of the quantity PIX, from the processing in accordance with the present invention of each such pair of pixels.

The following equations, which provide another manner of defining or calculating the print pixel value and the carry-over value for a given pixel pair formed of the individual pixels A and B in accordance with the present invention, are derived from the data in the table shown in FIG. 5:

$$PIX = (A \cdot B) + ((OLD + A) \oplus (OLD + B))$$

$$NEW = (OLD \cdot (A \cdot B)) + ((OLD + A) \oplus (OLD + B)),$$

wherein a multiplication point (".") designates the algebraic or logical "AND" operation, the "+" symbol designates the algebraic or logical "OR" operation, and the "⊕" symbol designates the algebraic or logical "exclusive OR" operation. Thus, the processing of the pixel pair A, B results in a new pixel pair denoted "PIX, 0", where "0" denotes a white pixel and "PIX" denotes the print pixel which, in fact, may consist (depending on the results of the calculation or processing) of either a printed black or color pixel or a second white pixel.

While there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. It is the intention, therefore, to be limited only as indicated by the scope of the claims appended hereto.

What is claimed is:

1. A method of printing characters on a print media using a reduced quantity of ink forming each said character with a print head as a plurality of individual pixels, each formed by applying to the media at an individual pixel location one or a plurality of superposed ink color liquids to define a print pixel or by an absence of ink color liquid at the pixel location to define a white pixel, said method comprising the steps of:

(A) arranging the plural pixels for each said character as a series of successive pairs of adjacent pixels and processing each pair of pixels so as to define, from original print information supplied for each pair of pixels, a print pixel and a white pixel to be printed for each said pair of pixels; and (B) for each said pair of pixels, applying one or a plurality of superposed ink color liquids to the media in accordance with said print pixel and said white pixel defined in said step (A) to form a checkerboard pattern on the print media.

2. A method of printing characters on a print media in accordance with claim 1, further comprising the steps of:

(i) assigning, for each said pair of pixels, an intensity value of one to each said print pixel of the individual pixels of said pixel pair and an intensity value of zero to each said white pixel of the individual pixels of said pixel pair;

(ii) for each said pair of pixels, adding the intensity values of the two pixels forming said pixel pair to define a sum and dividing said sum by two to define an intermediate value;

(iii) for each said pair of pixels, adding to said intermediate value defined in said step (ii) a carry-over value defined for a next-preceding pair of pixels of said series of successive pairs of adjacent pixels for each said character to define a final value for each said pair of pixels; and (iv) defining for each said pair of pixels a carry-over value in accordance with:

(1) where said final value defined in said step (iii) equals one, said carry-over value is zero; and (2) where said final value defined in said step (iii) equals −0.5, said carry-over value is −0.5.

3. A method of printing characters on a print media in accordance with claim 1, further comprising the steps of:

(i) assigning, for each said pair of pixels, an intensity value of one to each said print pixel of the individual pixels A and B of said pixel pair and an intensity value of zero to each said white pixel of the individual pixels A and B of said pixel pair;

(ii) defining a carry-over value NEW for said each pair of pixels and having a value of zero or one in accordance with:

$$NEW = (OLD \cdot (A \cdot B)) + ((OLD + A) \oplus (OLD + B)),$$

wherein OLD is the carry-over value defined for a next-preceding pair of pixels of said series of successive pairs of adjacent pixels for each said character, "·" denotes an algebraic AND operation, "+" denotes an algebraic OR operation, and ⊕ denotes an algebraic EXCLUSIVE OR operation; and (iii) defining a value of zero or one to said print pixel PIX of said step (A) in accordance with:

$$PIX = (A \cdot B) + ((OLD + A) \oplus (OLD + B)).$$

4. A method of printing characters on a print media using a reduced quantity of ink and forming each said character with a print head as a plurality of individual pixels, each formed by applying the media at an individual pixel location of an ink to define a print pixel or by an absence of ink at the pixel location to define a white pixel, said method comprising the steps of:

(A) arranging the plural pixels for each said character as a series of successive pairs of adjacent pixels and processing each pair of pixels so as to define, from original print information supplied for each pair of pixels, a print pixel and a white pixel to be printed for each said pair of pixels; and (B) for each said pair of pixels, applying an ink to the media in accordance with said print pixel and said white pixel defined in said step (A) to form a checkerboard pattern on the print media.

5. A method of printing characters on a print media in accordance with claim 4, further comprising the steps of:

(i) assigning, for each said pair of pixels, an intensity value of one to each said print pixel of the individual pixels of said pixel pair and an intensity value of zero to each said white pixel of the individual pixels of said pixel pair;

(ii) for each said pair of pixels, adding the intensity values of the two pixels forming said pixel pair to define a sum and dividing said sum by two to define an intermediate value;

(iii) for each said pair of pixels, adding to said intermediate value defined in said step (ii) a carry-over value defined for a next-preceding pair of pixels of said series of successive pairs of adjacent pixels for each said character to define a final value for said each pair of pixels; and (iv) defining for said each pair of pixels a carry-over value in accordance with:

(1) where said final value defined in said step (iii) equals one, said carry-over value is zero; and (2) where said final value defined in said step (iii) equals $-0.5$, said carry-over value is $-0.5$.

6. A method of printing characters on a print media in accordance with claim 4, further comprising the steps of:

(i) assigning, for each said pair of pixels, an intensity value of one to each said print pixel of the individual pixels A and B of said pixel pair and an intensity value of zero to each said white pixel of the individual pixels A and B of said pixel pair;

(ii) defining a carry-over value NEW for said each pair of pixels and having a value of zero or one in accordance with:

$$NEW = (OLD \cdot (A \cdot B)) + ((OLD + A) \oplus (OLD + B)),$$

wherein OLD is the carry-over value defined for a next-preceding pair of pixels of said series of successive pairs of adjacent pixels for each said character, "$\cdot$" denotes an algebraic AND operation, "$+$" denotes an algebraic OR operation, and $\oplus$ denotes an algebraic EXCLUSIVE OR operation; and (iii) defining a value of zero or one of said print pixel PIX of said step (A) in accordance with:

$$PIX = (A \cdot B) + ((OLD + A) \oplus (OLD + B)).$$

7. A method of printing characters on a print media using a reduced quantity of ink and forming each said character with a print head as a plurality of individual pixels, each formed by applying the media at an individual pixel location on ink to define a print pixel or by an absence of ink at the pixel location to define a white pixel, said method comprising the steps of:

(A) arranging the plural pixels for each said character as a series of pairs of adjacent pixels and processing each pair of pixels so as to define, from original print information supplied for each pair of pixels, a print pixel and a white pixel to be printed for each said pair of pixels; and (B) for each said pair of pixels, applying an ink to the media in accordance with said print pixel and said white pixel defined in said step (A) to form a checkerboard pattern on the print media.

8. A method of printing characters on a print media in accordance with claim 7, further comprising the steps of:

(i) assigning, for each said pair of pixels, an intensity value of one to each said print pixel of the individual pixels of said pixel pair and an intensity value of zero to each said white pixel of the individual pixels of said pixel pair;

(ii) for each said pair of pixels, adding the intensity values of the two pixels forming said pixel pair to define a sum and dividing said sum by two to define an intermediate value;

(iii) for each said pair of pixels, adding to said intermediate value defined in said step (ii) a carry-over value defined for a next-adjacent pair of pixels of said series of adjacent pairs of pixels for each said character to define a final value for said each pair of pixels; and (iv) defining for said each pair of pixels a carry-over value in accordance with:

(1) where said final value defined in said step (iii) equals one, said carry-over value is zero; and (2) where said final value defined in said step (iii) equals $-0.5$, said carry-over value is $-0.5$.

9. A method of printing characters on a print media in accordance with claim 7, further comprising the steps of:

(i) assigning, for each said pair of pixels, an intensity value of one to each said print pixel of the individual pixels A and B of said pixel pair and an intensity value of zero to each said white pixel of the individual pixels A and B of said pixel pair;

(ii) defining a carry-over value NEW for said each pair of pixels and having a value of zero or one in accordance with:

$$NEW = (OLD \cdot (A \cdot B)) + ((OLD + A) \oplus (OLD + B)),$$

wherein OLD is the carry-over value defined for an adjacent pair of pixels of said series of adjacent pairs of pixels for each said character, "$\cdot$" denotes an algebraic AND operation, "$+$" denotes an algebraic OR operation, and $\oplus$ denotes an algebraic EXCLUSIVE OR operation; and (iii) defining a value of zero or one to said print pixel PIX of said step (A) in accordance with:

$$PIX = (A \cdot B) + ((OLD \cdot A) \oplus (OLD + B)).$$

10. A process for printing characters on a print media using a reduced quantity of ink, comprising the steps of:

providing a printhead for printing characters as a plurality of individual pixels using liquid ink of at least one color;

producing a print pixel by applying ink liquid of a single color or by superimposing a plurality of colored inks;

producing a white pixel by an absence of ink liquid;

processing two adjacent pixels of original print information to form a print pixel and a white pixel; and arranging the formed print pixel and white pixel in a checkerboard pattern on the print medium.

* * * * *